US008914467B2

(12) United States Patent
Onoue

(10) Patent No.: US 8,914,467 B2
(45) Date of Patent: Dec. 16, 2014

(54) INFORMATION PROCESSING APPARATUS, SYSTEM, AND STORAGE MEDIUM

(75) Inventor: Koichi Onoue, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 335 days.

(21) Appl. No.: 13/422,107

(22) Filed: Mar. 16, 2012

(65) Prior Publication Data

US 2012/0303744 A1 Nov. 29, 2012

(30) Foreign Application Priority Data

May 23, 2011 (JP) ................................ 2011-115246

(51) Int. Cl.
G06F 15/16 (2006.01)
H04L 12/28 (2006.01)
G06F 21/53 (2013.01)
G06F 21/55 (2013.01)
G06F 21/60 (2013.01)
H04L 29/06 (2006.01)

(52) U.S. Cl.
CPC .............. *G06F 21/53* (2013.01); *G06F 21/554* (2013.01); *G06F 21/606* (2013.01); *H04L 63/00* (2013.01)
USPC ........... 709/217; 709/218; 709/219; 709/220; 709/222

(58) Field of Classification Search
CPC ................................ H04L 12/28; G06F 15/16
USPC ................... 709/220, 221, 229; 370/230, 352
See application file for complete search history.

(56) References Cited

U.S. PATENT DOCUMENTS 5,892,912 A 4/1999 Suzuki et al.
6,003,137 A * 12/1999 Kawasaki ...................... 726/15
6,085,238 A 7/2000 Yuasa et al.
2009/0006603 A1 * 1/2009 Duponchel et al. ........... 709/223
2009/0304008 A1 12/2009 Kono et al.
2012/0278802 A1 * 11/2012 Nilakantan et al. ............... 718/1

FOREIGN PATENT DOCUMENTS

| JP | 9-130421 A | 5/1997 |
| JP | 9-233110 A | 9/1997 |
| JP | 9-284328 A | 10/1997 |
| JP | 09-289521 A | 11/1997 |
| JP | 10-093610 A | 4/1998 |
| JP | 11-112547 A | 4/1999 |
| JP | 2009-296246 A | 12/2009 |
| JP | 2010-178211 A | 8/2010 |

OTHER PUBLICATIONS

"VINEA: A Policy-based Virtual Network Embedding Architecture"—Esposito et al, Boston Univ., Sep. 2009 http://www.cs.bu.edu/techreports/pdf/2013-010-vinea.pdf.*
Japanese Office Action mailed Sep. 16, 2014 for corresponding Japanese Patent Application 2011-115246, with Partial English Translation, 9 pages.
Onoue, Koichi, "Host-based Logical Isolation Technology for Scalable Cloud Networks," Information Processing Society of Japan Transactions, Oct. 2011, [CD-ROM], Japan, Information Processing Society of Japan, vol. 4, No. 4, pp. 180-190, with English Abstract.

* cited by examiner

*Primary Examiner* — Randy Scott
(74) *Attorney, Agent, or Firm* — Fujitsu Patent Center

(57) ABSTRACT

The information processing apparatus includes a storing unit and a transferring unit. The storing unit stores therein first association information, in which address information on a VM connected to a port is associated with information indicating a logical network, and second association information, in which information indicating the port is associated with information indicating the logical network to which the VM connected to the port belongs. When the address information received on a transmission source VM matches the address information indicated by the first association information, the transferring unit specifies the logical network that is indicated by the first association information and is associated with the matched address information. When the specified logical network matches the logical network indicated by the second association information, the transferring unit transfers the data to the port that is indicated by the second association information and is associated with the matched logical network.

6 Claims, 11 Drawing Sheets

FIG.2

| LNID | MAC |
|------|-----|
| $L_1$ | $M_{1-1}$, $M_{2-2}$ |
| $L_2$ | $M_{1-2}$, $M_{2-1}$ |

FIG.3A

| PORT NAME | LNID | MAC | 16B |
|---|---|---|---|
| $P_{1-1}$ | $L_1$ | $M_{1-1}$ | |

FIG.3B

| PORT NAME | LNID | MAC | 16B |
|---|---|---|---|
| $P_{1-2}$ | $L_2$ | $M_{1-2}$ | |

FIG.3C

| PORT NAME | LNID | MAC | 16D |
|---|---|---|---|
| $P_{2-1}$ | $L_2$ | $M_{2-1}$ | |

FIG.3D

| PORT NAME | LNID | MAC | 16D |
|---|---|---|---|
| $P_{2-2}$ | $L_1$ | $M_{2-2}$ | |

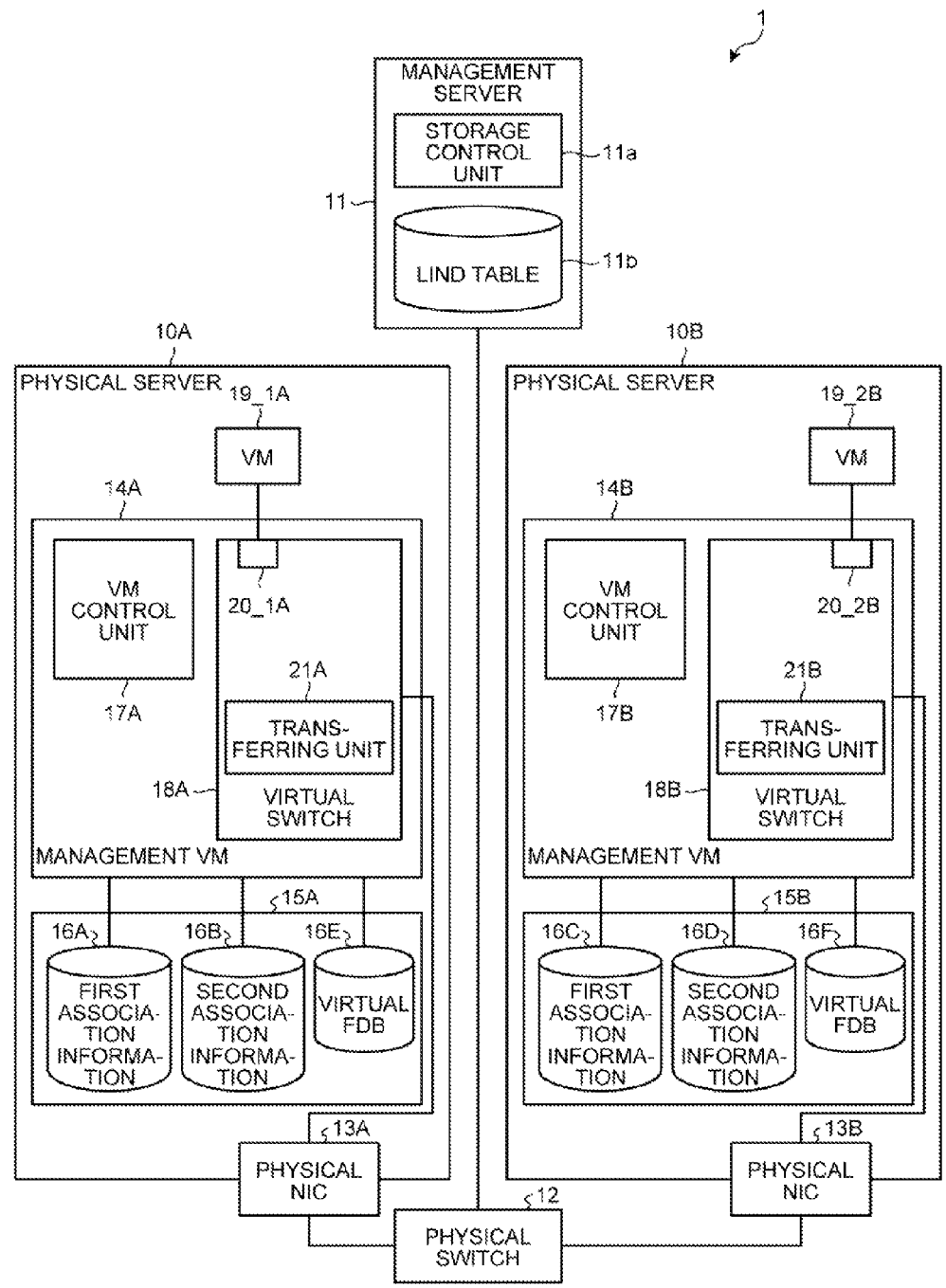

FIG.7A

| LNID | MAC |
|---|---|
| $L_1$ | $M_{1-1}$ |

| LNID | MAC |
|---|---|
| $L_1$ | $M_{1-1}, M_{2-2}$ |

| PORT NAME | LNID | MAC |
|---|---|---|
| $P_{2-2}$ | $L_1$ | $M_{2-2}$ |

16D

INFORMATION PROCESSING APPARATUS, SYSTEM, AND STORAGE MEDIUM

CROSS-REFERENCE TO RELATED APPLICATIONS

This application is based upon and claims the benefit of priority of the prior Japanese Patent Application No. 2011-115246, filed on May 23, 2011, the entire contents of which are incorporated herein by reference.

FIELD

The embodiments discussed herein are directed to an information processing apparatus, a system, and an information processing program.

BACKGROUND

There is a conventional technology for logically separating computing resources, such as servers. For example, there is a technology named cloud computing in which multiple computing resources on a network are used as user's computing resources. In cloud computing, virtual machines (VM) are allocated to different corporations or divisions, and thereby computing resources are separated for each corporation or division.

Furthermore, there is also a technology for creating a client address in a virtual group routing table and for identifying a virtual group of a client by using this table. Furthermore, there is also a technology for determining whether data is to be forwarded or deleted by using information on a MAC address of a terminal for each virtual group.

Examples of the technology for logically separating computing resources include virtual local area network tagging (VLAN tag: IEEE 802.1q standard) and a provider backbone bridge (PBB: IEEE 802.1ah standard). In the VLAN tag, a VLAN ID is embedded in a media access control (MAC) frame header as an identifier of a logical network. Computing resources are logically separated by using the VLAN ID. Furthermore, in the PBB, a service instance identification (I-SID), which is obtained by encapsulating a MAC frame, is embedded in the MAC frame and the computing resources are logically separated by using the I-SID.

Patent Document 1: Japanese Laid-open Patent Publication No. 09-289521
Patent Document 2: Japanese Laid-open Patent Publication No. 10-093610

However, in the above described technology, there is a problem in that a network is not adequately separated.

For example, in the above described technology for identifying a virtual group of a client, a network is not adequately separated if broadcast communication is performed with the broadcast address set in the header of the data to be transmitted. Specifically, in the above described technology for identifying a virtual group of the client, data is transmitted to all ports instead of being transmitted in virtual group units. Similarly, in the technology for determining whether the data is forwarded or deleted, a network is not adequately separated if broadcast communication is performed with the broadcast address set in the header of the data to be transmitted. Specifically, in the technology for determining whether data is to be forwarded or deleted, data is transmitted to all ports instead of being transmitted in virtual group units. This problem is not limited to cases in which a port is connected to a virtual device; it also occurs in cases in which a port is connected to a server device.

Furthermore, in a VLAN tag and PBB, because a VLAN ID or an I-SID is embedded in data to be transmitted, the size of the data becomes large. Accordingly, there is a problem in that a load is applied to the network. Furthermore, the number of identifiers of the logical network to be set in a header of the VLAN tag or the PBB are 4,096 and 16,777,216, respectively. Accordingly, there is a problem in that, in the VLAN tag and the PBB, the number of logical networks to be used is limited. Furthermore, when compared with other communication methods, because high-cost network devices are used in the PBB, there is a problem in that it is difficult to configure a low-cost network.

SUMMARY

According to an aspect of an embodiment of the invention, an information processing apparatus includes a storing unit that stores therein first association information, in which address information on a device connected to a port is associated with information indicating a logical network to which the device belongs, and second association information, in which information indicating the port is associated with the information indicating the logical network to which the device connected to the port belongs; and a transferring unit that receives data containing address information on a transmission source device, that specifies, when the address information on the transmission source device matches the address information indicated by the first association information, the logical network that is indicated by the first association information and is associated with the matched address information, that specifies, when the specified logical network matches the logical network indicated by the second association information, the port that is indicated by the second association information and is associated with the matched logical network, and that transfers the data to the specified port.

According to another aspect of an embodiment of the invention, an information processing apparatus includes a memory; and a processor coupled to the memory, wherein the processor executes a process includes receiving data containing address information on a transmission source device; specifying, when the address information on the transmission source device matches address information indicated by first association information stored in a storing unit that stores therein the first association information, in which address information on a device connected to a port is associated with information indicating a logical network to which the device belongs, and second association information, in which the information indicating the port is associated with the information indicating the logical network to which the device connected to the port belongs, the logical network that is indicated by the first association information and is associated with the matched address information; specifying, when the matched logical network matches the logical network indicated by the second association information, the port that is indicated by the second association information and is associated with the matched logical network; and transferring the data to the specified port.

According to still another aspect of an embodiment of the invention, a non-transitory computer readable storage medium having stored therein a information processing program causing a computer to execute a process includes receiving data containing address information on a transmission source device; specifying, when the address information on the transmission source device matches address information indicated by first association information stored in a storing unit that stores therein the first association information, in which address information on a device connected to a port is associated with information indicating a logical network to which the device belongs, and second association information, in which the information indicating the port is associated with the information indicating the logical network to which the device connected to the port belongs, the logical network that is indicated by the first association information and is associated with the matched address information; specifying, when the matched logical network matches the logical network indicated by the second association information, the port that is indicated by the second association information and is associated with the matched logical network; and transferring the data to the specified port.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 2 is a schematic diagram illustrating an example of first association information stored in a storing unit;

FIG. 3A is a schematic diagram illustrating an example of second association information stored in the storing unit;

FIG. 3B is a schematic diagram illustrating an example of the second association information stored in the storing unit;

FIG. 3C is a schematic diagram illustrating an example of the second association information stored in the storing unit;

FIG. 3D is a schematic diagram illustrating an example of the second association information stored in the storing unit;

FIG. 6 is a schematic diagram illustrating an example of a process performed by the storage control unit;

FIG. 7A is a schematic diagram illustrating an example of a process performed by the storage control unit;

FIG. 7B is a schematic diagram illustrating an example of a process performed by the storage control unit;

FIG. 7C is a schematic diagram illustrating an example of a process performed by the storage control unit;

DESCRIPTION OF EMBODIMENTS

Preferred embodiments of the present invention will be explained with reference to accompanying drawings. The present invention is not limited to these embodiments. Furthermore, the embodiments can be appropriately used in combination as long as processes do not contradict.

[a] First Embodiment

System Configuration

Figure 1:
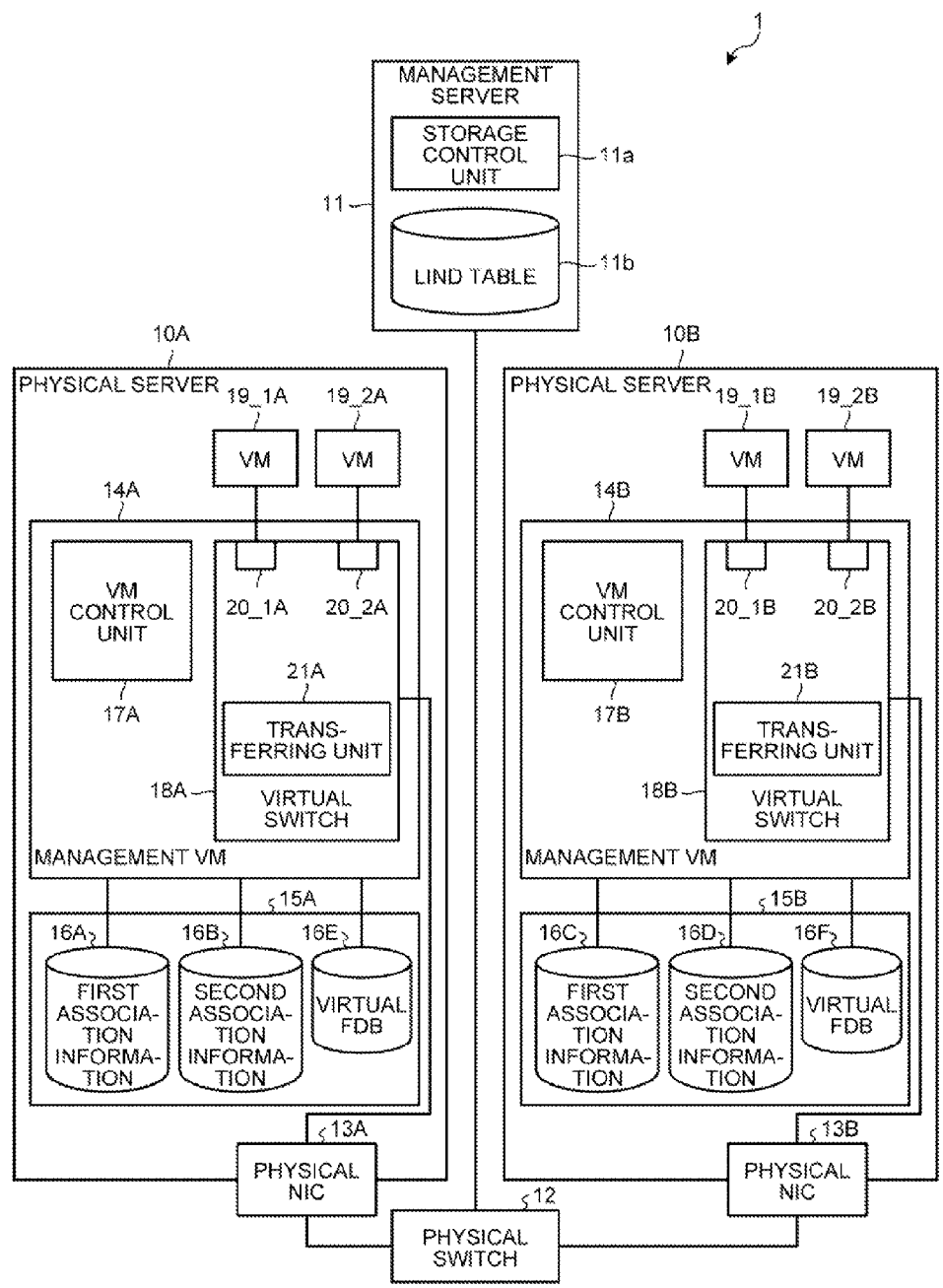
FIG. 1 is a schematic diagram illustrating an example of the overall configuration of a system used in an information processing apparatus according to a first embodiment.

An information processing apparatus and an information processing according to a first embodiment will be described. FIG. 1 is a schematic diagram illustrating an example of the overall configuration of a system used in an information processing apparatus according to a first embodiment. In the first embodiment, a description will be given of a case in which a virtual switch is used as an example of the information processing apparatus. In a system 1, a virtual machine monitor (VMM) that performs various control related to a virtual machine (VM), such as the operation of or the stopping of the VM, is operated on a physical server. Then, in the system 1, the VM is allocated for each corporation or division. Accordingly, in the system 1, the computing resource, such as servers or storages, is shared in multiple corporations or divisions. An example of location for the computing resource is a data center.

As illustrated in FIG. 1, the system 1 includes physical servers 10A and 10B, a management server 11, and a physical switch 12. In a description below, if there is no need to distinguish between the physical servers 10A and 10B, they are generically referred to as a physical server 10. In the example illustrated in FIG. 1, the number of the physical servers 10 is two, the number of the management servers is one, and the number of the physical switches 12 is one; however, the number of the physical servers 10, the management servers 11, and the physical switches 12 are not limited thereto. For example, the number of the physical servers 10 may also be three or more. Furthermore, multiple numbers of the management servers 11 and the physical switches 12 may also be used.

By operating the VMM, the physical server 10 operates a VM that is to be allocated to multiple corporations or divisions. The physical servers 10A and 10B are connected to the physical switch 12. The physical server 10A includes a physical network interface card (NIC) 13A, a management VM 14A, and a storing unit 15A. The physical server 10B includes a physical NIC 13B, a management VM 14B, and a storing unit 15B. The configuration of the physical server 10A and the physical server 10B are the same. Specifically, the configurations of the physical NIC 13A, the management VM 14A, and the storing unit 15A is the same as those of the physical NIC 13B, the management VM 14B, and the storing unit 15B, respectively. In the following, if there is no need to distinguish between the physical NIC 13A and the physical NIC 13B and between the management VM 14A and the management VM 14B, the physical NICs 13A and 13B and the managements VM 14A and VM 14B are generically referred to as a physical NIC 13 and a management VM 14, respectively. Furthermore, in the following, if there is no need to distinguish between the storing unit 15A and the storing unit 15B, they are generically referred to as a storing unit 15.

The physical NIC 13 is an interface for the communication between the physical switch 12 and a virtual switch 18, which will be described later. For example, the physical NIC 13 receives data, which is transmitted from a VM arranged in another physical server and is transferred by the physical switch 12, and transmits the received data to the virtual switch 18.

Figure 2:
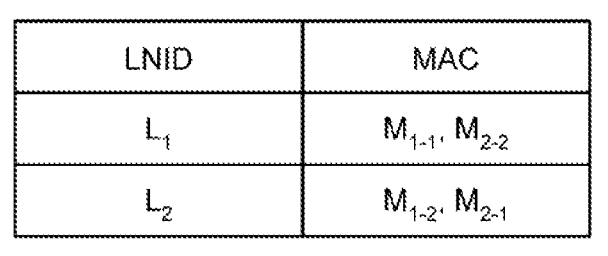

The storing unit 15A stores therein first association information 16A in which a logical network identification (LNID) that is information indicating a logical network to which a VM operated in the physical server 10 belongs is associated with a MAC address of a virtual NIC in a VM. Furthermore, the storing unit 15B stores therein first association information 16C in which an LNID that is information indicating a logical network to which a VM operated in the physical server 10 belongs is associated with a MAC address of a virtual NIC in a VM. In the following, if there is no need to distinguish between the first association information 16A and the first association information 16C, they are simply referred to as the first association information. Furthermore, in a description below, a MAC address of a virtual NIC in a VM may be referred to as a "MAC address of a VM". FIG. 2 is a schematic diagram illustrating an example of first association information stored in a storing unit. FIG. 2 illustrates a case, as an example, in which VMs having the MAC addresses of "$M_{1-1}$" and "$M_{2-2}$" of virtual NICs belong to a logical network indicated by the LNID "$L_1$". Furthermore, FIG. 2 illustrates a case, as an example, in which VMs having the MAC addresses of "$M_{1-2}$" and "$M_{2-1}$" of virtual NICs belong to a logical network indicated by the LNID "$L_2$". Furthermore, for example, the storing unit 15 may also stores therein a hash table, in which MAC addresses are used as hash values, and LNIDs and the MAC addresses are stored in the hash table in an associated manner. In such a case, to allow multiple LNIDs to be associated with the MAC addresses, the storing unit 15 may also stores a list of the LNIDs in an item in the hash table. Furthermore, for the relationship between an LNID and a MAC address, it is also possible to use any type of relationship, such as one to one, one to many, many to one, or many to many.

An example of the LNID includes a "global LNID" indicating that the LNID belongs to all of the logical networks. Specifically, a VM belonging to a logical network that is indicated by the "global LNID" can communicate with any VM belonging to any logical network.

Furthermore, the storing unit 15A stores therein second association information 16B in which information on a port of a virtual switch connected to a VM operated in the physical server 10 is associated with an LNID indicating a logical network to which the VM connected to the port belongs. Furthermore, the storing unit 15B stores therein second association information 16D in which information on a port of a virtual switch connected to a VM operated in the physical server 10 is associated with an LNID indicating a logical network to which the VM connected to the port belongs. In the following, if there is no need to distinguish between the second association information 16B and the second association information 16D, they are simply referred to as the second association information. FIGS. 3A to 3D are schematic diagrams each illustrating an example of the second association information stored in the storing unit. FIG. 3A illustrates a case, as an example, in which a VM that has a MAC address of a virtual NIC being "$M_{1-1}$" belongs to a logical network indicated by the LNID "$L_1$" and is connected to a port named "$P_{1-1}$". Furthermore, FIG. 3B illustrates a case, as an example, in which a VM that has a MAC address of a virtual NIC being "$M_{1-2}$" belongs to a logical network indicated by the LNID "$L_2$" and is connected to a port named "$P_{1-2}$". Furthermore, FIG. 3C illustrates a case, as an example, in which a VM that has a MAC address of a virtual NIC being "$M_{2-1}$" belongs to a logical network indicated by the LNID "$L_2$" and is connected to a port named "$P_{2-1}$". Furthermore, FIG. 3D illustrates a case, as an example, in which a VM that has a MAC address of a virtual NIC being "$M_{2-2}$" belongs to a logical network indicated by the LNID "$L_1$" and is connected to a port named "$P_{2-2}$".

Furthermore, the storing unit 15A stores therein a virtual FDB 16E corresponding to a virtual forwarding database (FDB) that is third information in which ports are associated with MAC addresses. The storing unit 15B also stores therein a virtual FDB 16F. In the following, if there is no need to distinguish between the virtual FDB 16E and the virtual FDB 16F, they are simply referred to as a virtual FDB.

The storing unit 15 is, for example, a semiconductor memory device, such as a flash memory, or a storage device, such as a hard disk or an optical disk. However, the storing unit 15 is not limited to these types of the storage device; the storing unit 15 may also be a random access memory (RAM) or a read only memory (ROM).

The management VM 14A and the management VM 14B each operates a VMM and performs various controls related to a VM. The management VM 14A includes a VM control unit 17A and a virtual switch 18A. The management VM 14B includes a VM control unit 17B and a virtual switch 18B. The VM control unit 17A and the virtual switch 18A are the same as the VM control unit 17B and the virtual switch 18B, respectively. In the following, if there is no need to distinguish between the VM control unit 17A and the VM control unit 17B and between the virtual switch 18A and the virtual switch 18B, the VM control units 17A and 17B and the virtual switches 18A and 18B are generically referred to as a VM control unit 17 and the virtual switch 18, respectively.

The management VM 14 is an integrated circuit, such as an application specific integrated circuit (ASIC) or a field programmable gate array (FPGA), or an electronic circuit, such as a central processing unit (CPU) or a micro processing unit (MPU).

The VM control unit 17 is a control unit that implements virtualization. For example, if the VM control unit 17 receives an instruction to operate a VM from the management server 11 via the physical switch 12 and the physical NIC 13, the VM control unit 17 operates the VM in a virtual region. FIG. 1 illustrates a case, as an example, in which the VM control unit 17A operates VMs 19_1A and 19_2A in a virtual region. Furthermore, FIG. 1 also illustrates a case, as an example, in which the VM control unit 17B operates VMs 19_1B and 19_2B in a virtual region. In the example illustrated in FIG. 1, the VM 19_1A is connected to a port 20_1A of the virtual switch 18A. Furthermore, in the example illustrated in FIG. 1, the VM 19_2A is connected to a port 20_2A of the virtual switch 18A. Furthermore, in the example illustrated in FIG. 1, the VM 19_1B is connected to a port 20_1B of the virtual switch 18B. Furthermore, in the example illustrated in FIG. 1, the VM 19_2B is connected to a port 20_2B of the virtual switch 18B.

Furthermore, the VM control unit 17 transmits information on the operated VM to the management server 11. For example, the VM control unit 17 transmits the MAC address of the operated VM to the management server 11. Furthermore, the VM control unit 17 transmits, to the management server 11, information on a port, for example, a port name, connected to the operated VM.

Furthermore, if the VM control unit 17 receives, from the management server 11, an instruction to store, in an associated manner, a MAC address of a VM and an LNID that indicates a logical network to which the VM belongs, the VM control unit 17 performs the following process. Namely, the VM control unit 17 stores, in the storing unit 15, the first information by associating the MAC address of the VM contained in the instruction with the LNID that indicates the logical network to which the VM belongs.

Furthermore, if the VM control unit 17 receives, from the management server 11, an instruction to store, in an associated manner, the information indicating the port connected to the VM, the LNID indicating the logical network to which the VM belongs, and the MAC address of the VM, the VM control unit 17 performs the following process. Namely, the VM control unit 17 stores, in the storing unit 15, the second information that contains, in an associated manner, the information indicating the port connected to the VM contained in the instruction, the LNID indicating the logical network to which the VM belongs, and the MAC address of the VM.

Furthermore, if the VM control unit 17 receives, from the management server 11, an instruction to delete, from the storing unit 15, a record of a stopped VM or a record of a VM from which allocation of the logical network is released, the VM control unit 17 performs the following process. Namely, the VM control unit 17 deletes, from the storing unit 15 in accordance with the instruction, the record including the stopped VM or the MAC address of the VM from which the allocation of the logical network is released.

The VM operated by the VM control unit 17 belongs to a logical network from among a plurality of logical networks. Because the VM belongs to the logical network in this way, the VM is allocated to a corporation or a division associated with the logical network. Here, to communicate in the same corporation or in the same division, the VM communicates with another VM that belongs to the logical network to which the subject VM belongs. For example, the VM broadcasts an ARP request to another VM belonging to the same logical network. In this case, the ARP request contains, as the transmission source address, a MAC address of a VM of a transmission source and contains, as the destination address, a broadcast address. Furthermore, the VM can communicate with another VM by containing, in the data to be transmitted, address information on the other VM as the destination address.

The virtual switch 18 performs the switching of the received data. For example, the virtual switch 18A includes a transferring unit 21A. Furthermore, the virtual switch 18B includes a transferring unit 21B. The transferring unit 21A and the transferring unit 21B are the same. In the following, if there is no need to distinguish between the transferring unit 21A and the transferring unit 21B, they are simply referred to as a transferring unit 21.

If the transferring unit 21 receives the data containing MAC address information on a VM that corresponds to the transmission source, the transferring unit 21 determines whether the MAC address information on the VM corresponding to the transmission source matches the MAC address information that is indicated by the first association information. If the MAC address information on the VM corresponding to the transmission source matches the MAC address information indicated by the first association information, the transferring unit 21 specifies a logical network that is indicated by the first association information and is associated with the matched address information. Then, the transferring unit 21 determines whether the specified logical network matches the logical network that is indicated by the second association information. If the specified logical network matches the logical network indicated by the second association information, the transferring unit 21 specifies a port that is indicated by the second association information and is associated with the matched logical network. Then, the transferring unit 21 transfers the data to the specified port. In this way, the transferring unit 21 transmits the data to the VM connected to the port.

For example, if the transferring unit 21 receives the data transmitted from the VM, the transferring unit 21 specifies a port of the virtual switch 18 that is associated with the destination of the received data. Specifically, if the destination address is a broadcast address, the transferring unit 21 specifies all of the ports in the virtual switch 18 as the destination port. Furthermore, if the destination address is a MAC address of a VM, the transferring unit 21 searches a virtual FDB by using the destination address as a key and specifies a port in the virtual switch 18. If a port associated with the MAC address of the VM is not searched, the transferring unit 21 specifies all of the ports in the virtual switch 18 as the ports of the destination.

Then, the transferring unit 21 acquires the MAC address ($MAC_{SRC}$) of the VM corresponding to the transmission source contained in the received data. Subsequently, the transferring unit 21 determines whether the acquired $MAC_{SRC}$ is registered, as the MAC address of the VM, in the first association information in the storing unit 15.

If the acquired $MAC_{SRC}$ is not registered in the first association information as the MAC address of the VM, there is no VM belonging to the same logical network to which the transmission source VM belongs. Accordingly, the transferring unit 21 discards the received data.

In contrast, if the acquired $MAC_{SRC}$ is registered in the first association information as the MAC address of the VM, it is assumed that a VM belonging to the same logical network to which the transmission source VM belongs is operated. Accordingly, in such a case, the transferring unit 21 specifies, from the record of the $MAC_{SRC}$ registered in the first association information, the LNID ($LNID_{SRC}$) that indicates the logical network to which the VM corresponding to the transmission source of the data belongs. Subsequently, as will be described below, the transferring unit 21 determines whether all of the ports in the virtual switch 18 associated with the destination of the data have been selected.

If not all of the ports associated with the destination of the data in the virtual switch 18 has been selected, the transferring unit 21 performs the following process. Namely, the transferring unit 21 selects, from among all of the ports associated with the destination of the data in the virtual switch 18, a port that has not been selected and specifies, from the second association information, the $LNID_{DST}$ associated with the selected port.

Then, if the specified $LNID_{SRC}$ matches the $LNID_{DST}$ that is newly specified, the transferring unit 21 transfers the received data to the newly selected port.

Furthermore, if the specified $LNID_{SRC}$ is a "global LNID", the transferring unit 21 transfers the received data to the newly selected port.

Furthermore, if the specified $LNID_{DST}$ is a "global LNID", the transferring unit 21 transfers the received data to the newly selected port.

In contrast, if the specified $LNID_{SRC}$ does not match the newly specified $LNID_{DST}$ and if the specified $LNID_{SRC}$ and the newly specified $LNID_{DST}$ are not the "global LNID", the transferring unit 21 performs the following process. Namely, the transferring unit 21 prohibits the transmission of the received data to the newly selected port.

The transferring unit 21 repeatedly performs this process until the transferring unit 21 selects all of the ports that are in the virtual switch 18 and that are associated to the destination of the data.

Figure 4:
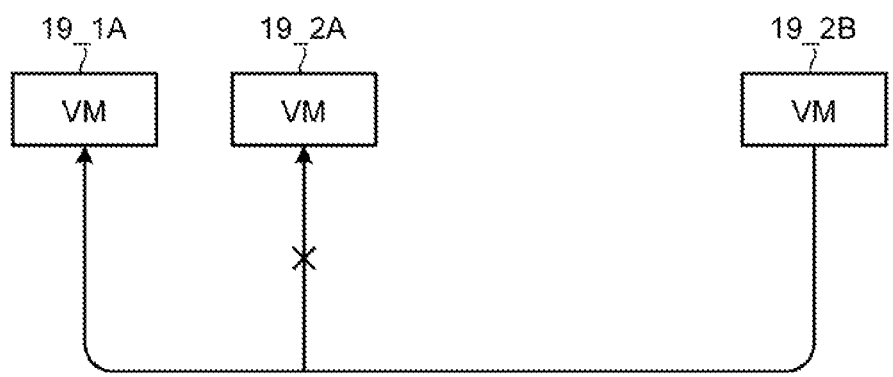
FIG. 4 is a schematic diagram illustrating an example of a process performed by a transferring unit according to the first embodiment.

FIG. 4 is a schematic diagram illustrating an example of a process performed by a transferring unit according to the first embodiment. FIG. 4 illustrates a case, as an example, in which the VM 19_2B broadcasts the data to VMs belonging to the same logical network. In the example illustrated in FIG. 4, the VM 19_1A belongs to the same logical network as that to which the VM 19_2B belongs, whereas the VM 19_2A belongs to the logical network different from that to which the VM 19_2B belongs. In the example illustrated in FIG. 4, the transferring unit 21 transfers the data to the VM 19_1A by transferring the data to the port connected to the VM 19_1A. Furthermore, in the example illustrated in FIG. 4, by prohibiting the transferring of the data to the port connected to the VM 19_2A, the transferring unit 21 prohibits the data from being transferred to the VM 19_2A.

As described above, from the association relationship between the MAC address information and the logical network indicated by the first association information, the transferring unit 21 specifies, as the logical network to which the transmission source VM belongs, the logical network associated with the MAC address of the transmission source VM. From the association relationship between the logical network and the port indicated by the second association information, the transferring unit 21 specifies the port associated with the logical network to which the transmission source VM belongs. The transferring unit 21 transfers the data to the specified port. Accordingly, even if the destination address contained in the data is a broadcast address, the transferring unit 21 can broadcast to only the logical network to which the transmission source VM belongs. Therefore, the logical network can be adequately separated.

Furthermore, the transferring unit 21 compares the logical network of the transmission source contained in the data with the logical network associated with the port. Then, if the logical networks do match or if the LNID of either of the logical networks is a "global LNID", the transferring unit 21 transfers the received data to a port that is newly selected. Specifically, the transferring unit 21 does not compare the logical network, to which transmission source VM contained in the data belongs, with the logical network, to which the transmission destination VM contained in the data belongs. The reason for this will be described. For example, if the destination address contained in the data is a broadcast address, it is not possible for the transferring unit 21 to specify, from the first association information in which the address information is associated with the information that indicates the logical network, the logical network to which the transmission destination VM belongs. This is because the broadcast address and the information that indicates the logical network are not associated with each other in the first association information. In such a case, it is not possible to specify the logical network to which the transmission destination VM belongs, i.e., to specify the logical network used for the comparison; therefore, it is not possible to control the data transfer, such as transferring the data to the port or prohibiting the transferring of the data to the port. Accordingly, instead of using the logical network to which the transmission destination VM contained in the data belongs for the comparison, the transferring unit 21 controls the data transfer by using the logical network associated with the port for the comparison. Accordingly, the transferring unit 21 can prevent the occurrence of a case in which the data transfer is not controlled.

Furthermore, the transferring unit 21 specifies the logical network associated with the port from the second association information in which information indicating the port is associated with, one to one, information indicating the logical network to which the VM connected to the port belongs. Accordingly, the logical network can be easily specified by searching, using the address information on the transmission source VM as a key, a table, which stores therein the address information that is associated with the information indicating the logical network, for the information indicating the logical network.

Furthermore, the transferring unit 21 can separate the network by performing adequate transferring on the network data that does not contain an identifier for identifying the logical network. Specifically, when compared with a case in which data contains an identifier for identifying the logical network, the transferring unit 21 can separate the network in accordance with data whose size and load is small on the network. Accordingly, when separating the network, the transferring unit 21 can reduce the load on the network.

Furthermore, the transferring unit 21 separates the network in accordance with the network data that does not contain the identifier for identifying the logical network. Specifically, because the number of logical networks to be handled depends on the capacity of the storing unit 15, the number of logical networks that can be handled increases when compared with a case in which the identifier is contained in the network data.

Referring back to FIG. 1, the management server 11 manages the operation or the stopping of the VM. The management server 11 includes a receiving unit, such as a keyboard or a mouse, that receives an instruction from a user and transmits, to the physical server 10, the instruction from the user received by the receiving unit. For example, if the management server 11 receives an instruction to operate the VM in the physical server 10, the management server 11 transmits the received instruction to the physical server 10. The management server 11 includes a storage control unit 11a and a LNID table 11b.

In the LNID table 11b, for all of the logical networks, information that indicates the logical network, to which the VM operated in the physical server 10 belongs, and the MAC address of the VM are registered in an associated manner. In the LNID table 11b, the information is registered by the storage control unit 11a, which will be described later.

If the storage control unit 11a receives an instruction to allocate a new logical network to the VM that is operated in the physical server 10, the storage control unit 11a performs the following process. Namely, the storage control unit 11a registers, in an associated manner in the LNID table 11b, the LNID, which is indicated by the received instruction and indicates a new logical network that is newly allocated, and the MAC address of the VM. Furthermore, the storage control unit 11a transmits, to each physical server 10, an instruction to store, in an associated manner, the MAC address of the VM and the LNID that indicates the logical network to which the VM belongs. At this stage, the storage control unit 11a transmits, to each physical server 10, the instruction to store only the information in which the LNIDs of all of the logical networks to which the VMs operated in the physical server 10 belong are associated with the MAC addresses of all of the VMs belonging to the logical networks. Accordingly, each storing unit 15 in each physical server 10 stores therein the first association information that contains only the information in which the LNIDs of all of the logical networks to which the VMs operated in each physical server 10 belong are associated with the MAC addresses of all of the VMs belonging to the logical networks. Accordingly, for all of the logical networks and the VMs, when compared in a case of storing the first association information in which the LNIDs are associated with the MAC addresses of the VMs, each storing unit 15 can store therein a small amount of the first association information. Furthermore, because each storing unit 15 stores therein, in an associated manner, the LNIDs of the VMs in the physical server 10 and the MAC addresses of the VMs, each storing unit 15 stores therein information needed for the control of the data transfer performed by the transferring unit 21. Specifically, due to the process performed by the storage control unit 11a, each storing unit 15 can store therein a small amount of information needed for the control of the data transfer.

In the following, a description will be given using a specific example. For example, it will be assumed that three VMs, i.e., the VM 19_1A, the VM 19_2A, and the VM 19_2B, are operated in the system 1 and that the LNIDs indicating the logical networks to which the VMs belong are "$L_1$", "$L_2$", and "$L_1$". In such a case, if only the VM 19_1A out of the three VMs is operated in a single physical server 10, the VM 19_1A and the VM 19_2B are associated with the LNID "L1" and registered in the first association information stored in the storing unit 15 in this physical server 10. Specifically, in the first association information in this case, only the information on the VM related to the LNID "$L_1$" to which the operated VM belongs is registered; therefore, the information on the VM related to the LNID "$L_2$" to which the VM operated only in another physical server 10 belongs is not registered.

Furthermore, if a new VM is operated, the storage control unit 11a performs the following process. Namely, the storage control unit 11a transmits, to the physical server 10 that includes a new operated VM, an instruction to store, in an associated manner, the MAC address of the new operated VM, the information indicating the port connected to the subject VM, and the LNID that indicates the logical network to which the subject VM belongs. Accordingly, the storing unit 15 in the physical server 10, which receives the instruction, stores therein the second association information that contains, in an associated manner, the MAC address of the VM operated in the physical server 10, the LNID of the logical network to which the VM belongs, and the information on the port.

Furthermore, if the VM stops or if the allocation of the logical network to the VM is released, the storage control unit 11a performs the following process. Namely, the storage control unit 11a transmits, to each physical server 10, an instruction to delete, from the storing unit 15, a record of the stopped VM or a record of the VM from which the allocation of the logical network is released.

Figure 5:
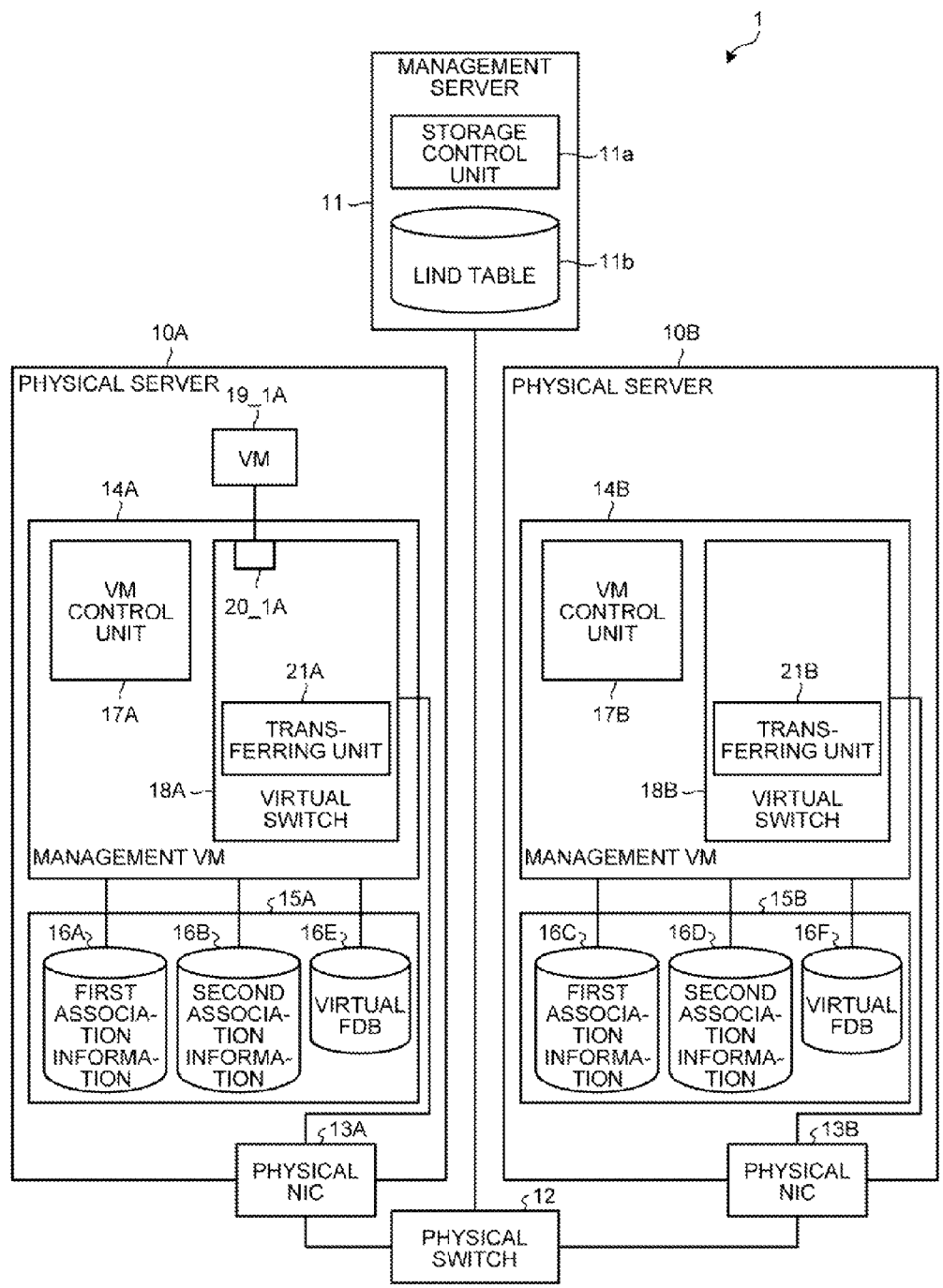
FIG. 5 is a schematic diagram illustrating an example of a process performed by a storage control unit.

FIGS. 5, 6, and 7A to 7C are schematic diagrams each illustrating an example of a process performed by the storage control unit. FIG. 5 illustrates a case, as an example, in which, a single VM 19_1A is operated in the physical server 10A, whereas no VM is operated in the physical server 10B. In the example illustrated in FIG. 5, the storing unit 15A in the physical server 10A stores therein the first association information 16A in which the LNID indicating the logical network to which the VM 19_1A belongs is associated with the MAC address of the VM 19_1A. FIG. 7A is a schematic diagram illustrating an example of the content registered in the first association information 16A that is illustrated in the example in FIG. 5. FIG. 7A illustrates a case, as an example, in which the LNID "$L_1$" indicating the logical network to which the VM 19_1A belongs is associated with the MAC address "$M_{1-1}$" of the VM 19_1A and registered in the first association information 16A.

In the example illustrated in FIG. 5, if the management server 11 receives, from a user, an instruction to operate a VM in the physical server 10B, the management server 11 transmits the received instruction to the physical server 10B. Then, the VM control unit 17B in the physical server 10B operates the VM. FIG. 6 illustrates a case, as an example, in which the VM control unit 17B operates the VM 19_2B. In the example illustrated in FIG. 6, after operating the VM 19_2B, the VM control unit 17B transmits the MAC address of the operated VM 19_2B to the management server 11. Furthermore, in the example illustrated in FIG. 6, the VM control unit 17B transmits, to the management server 11, the information indicating the port, for example, a port name, connected to the operated VM 19_2B.

Then, in the example illustrated in FIG. 6, if the storage control unit 11a of the management server 11 receives an instruction to allocate a new logical network to the VM 19_2B, the storage control unit 11a performs the following process. Namely, the storage control unit 11a registers, in the LNID table 11b, by associating the LNID "$L_t$", which is indicated by the received instruction and indicates a new logical network to be allocated, with the MAC address "$M_{2-2}$" of the VM 19_2B. Furthermore, in the example illustrated in FIG. 6, the storage control unit 11a transmits, to the physical server 10A, an instruction to further store the LNID "$L_1$" by associating it with the MAC address "$M_{2-2}$". Furthermore, in the example illustrated in FIG. 6, the storage control unit 11a transmits, to the physical server 10B, an instruction to store the LNID "$L_1$", the MAC addresses "$M_{1-1}$" and "$M_{2-2}$". Accordingly, the content stored in the storing units 15A and 15B becomes the following. Namely, the storing unit 15 stores therein the first association information that contains only the information in which the LNID "$L_1$" of the logical network to which the VMs 19_1A and 19_2B belong is associated with the MAC addresses "$M_{1-1}$" and "$M_{2-2}$" of all of the VMs belonging to this logical network. FIG. 7B is a schematic diagram illustrating an example of the content registered in the first association information 16C illustrated in the example in FIG. 6. FIG. 7B illustrates a case, as an example, in which, in the first association information 16C, the LNID "$L_1$" indicating the logical network to which the VM 19_2B belongs is associated with the MAC addresses "$M_{1-1}$" and "$M_{2-2}$" of the VMs belonging to the logical network that is indicated by the LNID "$L_1$".

Furthermore, in the example illustrated in FIG. 6, because the VM 19_2B is newly operated, the storage control unit 11a performs the following process. Namely, the storage control unit 11a transmits, to the physical server 10B, an instruction to store, in an associated manner, the MAC address of the VM 19_2B, the information indicating the port connected to the VM 19_2B, and the LNID indicating the logical network to which the VM 19_2B belongs. FIG. 7C is a schematic diagram illustrating an example of the content registered in the second association information 16D illustrated in the example in FIG. 6. FIG. 7C illustrates a case, as an example, in which the port name "$P_{2-2}$", the MAC address "$M_{2-2}$", and the LNID "$L_1$" are associated with each other and registered in the second association information 16D.

Flow of a Process

Figure 8:
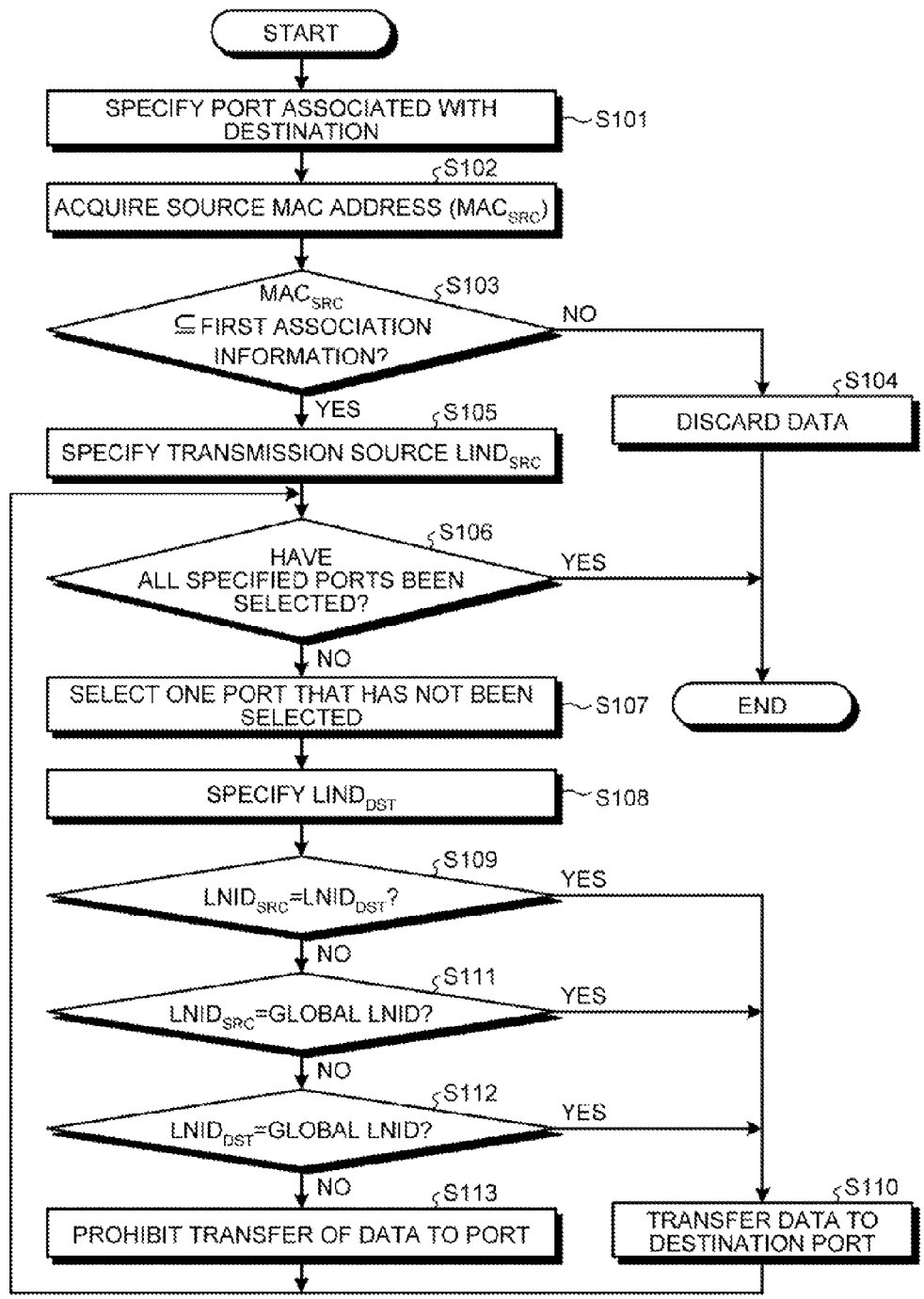
FIG. 8 is a flowchart illustrating a transfer process according to the first embodiment.

In the following, the flow of a process performed by the physical server 10 according to the first embodiment will be described. FIG. 8 is a flowchart illustrating a transfer process according to the first embodiment. This transfer process is performed which the virtual switch 18 receives data.

As illustrated in FIG. 8, if the transferring unit 21 receives data transmitted from the VM, the transferring unit 21 specifies, using a virtual FDB or the like, the port of the virtual switch 18 associated with the destination of the received data (Step S101).

The transferring unit 21 acquires the MAC address ($MAC_{SRC}$) of the transmission source VM contained in the received data (Step S102). Then, the transferring unit 21 determines whether the acquired $MAC_{SRC}$ is registered in the first association information as the MAC address of the VM (Step S103).

If the $MAC_{SRC}$ is not registered in the first association information as the MAC address of the VM (No at Step S103), the transferring unit 21 discards the received data (Step S104) and ends the process.

In contrast, if the $MAC_{SRC}$ is registered in the first association information as the MAC address of the VM (Yes at Step S103), the transferring unit 21 performs the following process. Namely, the transferring unit 21 specifies, from the record in which the $MAC_{SRC}$ is registered in the first association information, the LNID ($LNID_{SRC}$) that indicates the logical network to which the VM corresponding to the transmission source of the data belongs (Step S105). Subsequently, the transferring unit 21 determines whether all of the ports of the virtual switch 18 associated with the destination of the data specified at Step S101 have been selected (Step S106).

If all of the ports in the virtual switch 18 associated with the destination of the data have been selected (Yes at Step S106), the transferring unit 21 ends the process. If not all of the ports in the virtual switch 18 associated with the destination of the data has been selected (No at Step S106), the transferring unit 21 selects, from all of the ports in the virtual switch 18 associated with the destination of the data, one port that has not been selected (Step S107). Subsequently, the transferring unit 21 specifies the $LNID_{DST}$ that is associated with the selected port from the second association information (Step S108).

Then, the transferring unit 21 determines whether the specified $LNID_{SRC}$ matches the newly specified $LNID_{DST}$ (Step S109). If the specified $LNID_{SRC}$ matches the newly specified $LNID_{DST}$ (Yes at Step S109), the transferring unit 21 transfers the received data to the port that is newly selected at Step S107 (Step S110) and returns to Step S106.

In contrast, if the specified $LNID_{SRC}$ does not match the newly specified $LNID_{DST}$ (No at Step S109), the transferring unit 21 determines whether the specified $LNID_{SRC}$ is the "global LNID" (Step S111). If the specified $LNID_{SRC}$ is the "global LNID" (Yes at Step S111), the process proceeds to Step S110.

If the specified $LNID_{SRC}$ is not the "global LNID" (No at Step S111), the transferring unit 21 determines whether the specified $LNID_{DST}$ is the "global LNID" (Step S112). If the specified $LNID_{DST}$ is the "global LNID" (Yes at Step S112), the process proceeds to Step S110.

In contrast, if the specified $LNID_{DST}$ is not the "global LNID" (No at Step S112), the transferring unit 21 prohibits the transfer of the received data to the port that is newly selected at Step S107 (Step S113) and returns to Step S106.

Advantage of the First Embodiment

As described above, if the virtual switch 18 according to the embodiment receives data containing the MAC address information on the VM that corresponds to the transmission source, the virtual switch 18 determines whether the MAC address information on the VM that corresponds to the transmission source matches the MAC address information indicated by the first association information. If the MAC address information on the transmission source VM matches the MAC address information indicated by the first association information, the virtual switch 18 according to the first embodiment specifies the logical network that is indicated by the first association information and is associated with the matched address information. Then, the virtual switch 18 according to the first embodiment determines whether the specified logical network matches the logical network indicated by the second association information. If the specified logical network matches the logical network indicated by the second association information, the virtual switch 18 according to the first embodiment specifies the port that is indicated by the second association information and is associated with the matched logical network. Accordingly, even if the destination address contained in the data is the broadcast address, the virtual switch 18 according to the first embodiment can broadcast only to the logical network to which the transmission source VM belongs, thereby the logical network can be more adequately separated.

Furthermore, the virtual switch 18 according to the first embodiment compares the logical network of the transmission source contained in the data with the logical network that is associated with the port. Then, if the logical networks do match or if the LNID of either of the logical networks is the "global LNID", the virtual switch 18 according to the first embodiment transfers the received data to the newly selected port. Specifically, the virtual switch 18 according to the first embodiment does not compare the logical network, to which the transmission source VM contained in the data belongs, with the logical network, to which the transmission destination VM contained in the data belongs. The virtual switch 18 according to the first embodiment controls the data transfer by using the logical network associated with the port for the comparison without using, for the comparison, the logical network to which the transmission destination VM contained in the data belongs. Accordingly, with the virtual switch 18 according to the first embodiment, it is possible to prevent the occurrence of a case in which the data transfer is not controlled.

Furthermore, the virtual switch 18 according to the first embodiment specifies the logical network associated with the port from the second association information in which the information indicating the port is associated with, one to one, the information indicating the logical network to which the VM connected to the port belongs. Accordingly, when compared with a case of searching for the information indicating the logical network, the virtual switch 18 can easily specify the logical network by searching, using the address information on the transmission source VM as a key, the table that stores therein, in an associated manner, the address information and the information indicating the logical network.

Furthermore, the virtual switch 18 according to the first embodiment can separate the network by adequately transferring the network data that does not contain the identifier for identifying the logical network. Specifically, when compared with a case in which the data contains the identifier that identifies the logical network, the virtual switch 18 according to the first embodiment can separate the network in accordance with the data whose size and load is small on the network. Accordingly, when separating the network, the virtual switch 18 according to the first embodiment can reduce the load on the network.

Furthermore, the virtual switch 18 according to the first embodiment separates the network in accordance with the network data that does not contain the identifier for identifying the logical network. Specifically, because the number of the logical networks to be handled depends on the capacity of the storing unit 15, it is possible to increase the number of logical networks to be handled when compared with a case in which the network data contains the identifier.

Furthermore, if the system 1 according to the first embodiment receives an instruction to allocate a new logical network to the VM that is operated in the physical server 10, the system 1 performs the following process. Namely, the system 1 according to the first embodiment associates the LNID that indicates the logical network, which is indicated by the received instruction and is to be newly allocated, with the MAC address of the VM and registers them in the LNID table 11b. In addition to this, the system 1 according to the first embodiment transmits, to each physical server 10, an instruction to store, in an associated manner, the MAC address of the VM and the LNID indicating the logical network to which the VM belongs. At this time, the system 1 according to the first embodiment transmits, to each physical server 10, an instruction to store only the information in which each of the LNIDs of all of the logical networks to which the VMs operated in the physical server 10 belong is associated with each of the MAC addresses of all of the VMs belonging to the logical networks. Accordingly, only the information, in which each of the LNIDs of all of the logical networks to which the VMs operated in each physical server 10 belong is associated with each of the MAC addresses of all of the VMs belonging to the logical networks, is registered in the first association information stored in each physical server 10. Accordingly, for all of the logical networks and the VMs, when compared with a case of storing the first association information in which the LNIDs are associated with the MAC addresses of the VMs, each storing unit 15 can store a small amount of the first association information. Furthermore, because each storing unit 15 stores therein the first association information in which the LNIDs to which the VMs operated in the physical server 10 belong are associated with the MAC addresses of the VMs, the storing unit 15 stores therein the information needed for controlling the data transfer performed by the transferring unit 21. Specifically, due to the process performed by the system 1 according to the first embodiment, each storing unit 15 can store therein a small amount of information needed for the control of the data transfer.

[b] Second Embodiment

In the first embodiment, a case has been described in which the transfer of the received data is controlled; however, the information processing apparatus disclosed in the present invention is not limited thereto. Accordingly, in a second embodiment, a description will be given of a case in which the transfer of the transmission data is controlled.

System Configuration

Figure 9:
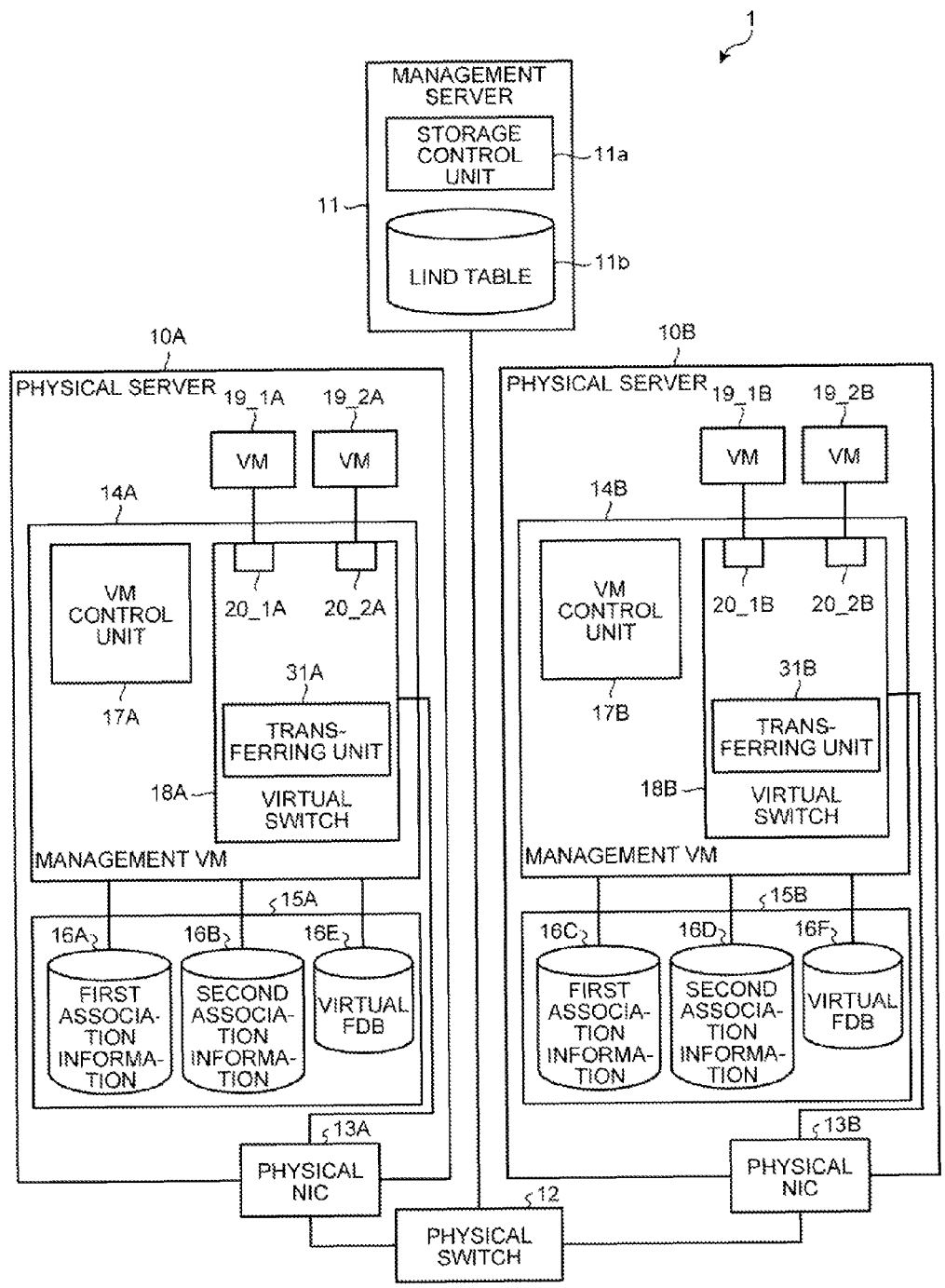
FIG. 9 is a schematic diagram illustrating an example of the overall configuration of a system used in an information processing apparatus according to a second embodiment.

FIG. 9 is a schematic diagram illustrating an example of the overall configuration of a system used in an information processing apparatus according to a second embodiment. In the second embodiment, in a similar manner as in the first embodiment, a description will also be given of a case in which the virtual switch is used as an example of the information processing apparatus. As illustrated in FIG. 9, the virtual switch 18A according to the second embodiment differs from the first embodiment in that it includes a transferring unit 31A instead of the transferring unit 21A according to the first embodiment illustrated in FIG. 1. Similarly, the virtual switch 18B according to the second embodiment differs from the first embodiment in that it includes a transferring unit 31B, instead of including the transferring unit 21B according to the first embodiment illustrated in FIG. 1. In the following description, components having the same function as those in the first embodiment are assigned the same reference numerals illustrated in FIG. 1; therefore, a description thereof is omitted. Furthermore, the transferring unit 31A and the transferring unit 31B are the same. In the following, if there is no need to distinguish between the transferring unit 31A and the transferring unit 31B, they are simply referred to as a transferring unit 31.

In addition to the function performed by the transferring unit 21 according to the first embodiment, the transferring unit 31 according to the second embodiment checks if there is any fraudulent information contained in the data transmitted from the VM. If fraudulent information is contained in the data, the transferring unit 31 prohibits the transmission of the data. An example of fraudulence includes a case in which an attacker to the system 1 transmits, from the VM, the data containing a fraud MAC address of the transmission source VM.

For example, the transferring unit 31 acquires the MAC address of the transmission source VM contained in the data that is transmitted from the VM. Then, from the association relationship between the ports and the MAC addresses indicated by the second association information, the transferring unit 31 acquires, using the port connected to the VM that transmits the data as a key, the MAC address of the VM connected to the port.

Subsequently, the transferring unit 31 determines whether the MAC address of the transmission source VM contained in the data that is transmitted from the VM matches the MAC address acquired from the association relationship indicated by the second association information. If the MAC address of the transmission source VM contained in the data transmitted from the VM matches the MAC address acquired from the association relationship indicated by the second association information, the transferring unit 31 transmits the data to the physical NIC 13. In contrast, the MAC address of the transmission source VM contained in the data transmitted from the VM does not match the MAC address acquired from the association relationship indicated by the second association information, the transferring unit 31 discards the data and prohibits the transmission of the data. The reason for this is that, if these two MAC addresses differ, it is assumed that the data to be transmitted may be data that contains a fake MAC address of the transmission source VM.

Furthermore, as described above, in addition to comparing the MAC addresses and checking whether there is any fraudulent information contained in the data, the transferring unit 31 may also check whether there is any fraudulent information contained in the data by comparing the information on the logical networks.

Specifically, by using the MAC address of the transmission source VM contained in the data transmitted from the VM as a key, the transferring unit 31 acquires the LNID associated with the MAC address of the VM from the association relationship between the MAC addresses and the LNIDs indicated by the first association information. Furthermore, from the association relationship between the ports and the LNIDs indicated by the second association information, by using the port connected to the VM that transmits the data as a key, the transferring unit 31 acquires the LNID of the logical network to which the VM connected to the port belongs.

Subsequently, the transferring unit 31 determines whether the LNID acquired from the association relationship indicated by the first association information matches the LNID acquired from the association relationship indicated by the second association information. If the LNID acquired from the association relationship indicated by the first association information matches the LNID acquired from the association relationship indicated by the second association information, the transferring unit 31 transfers the data to the physical NIC 13. In contrast, if the LNID acquired from the association relationship indicated by the first association information does not match the LNID acquired from the association relationship indicated by the second association information, the transferring unit 31 discards the data and prohibits the transmission of the data. The reason for this is that, if these two LNIDs differ, it is assumed that the data to be transmitted may be data containing a fake MAC address of the transmission source VM.

Flow of a Process

Figure 10:
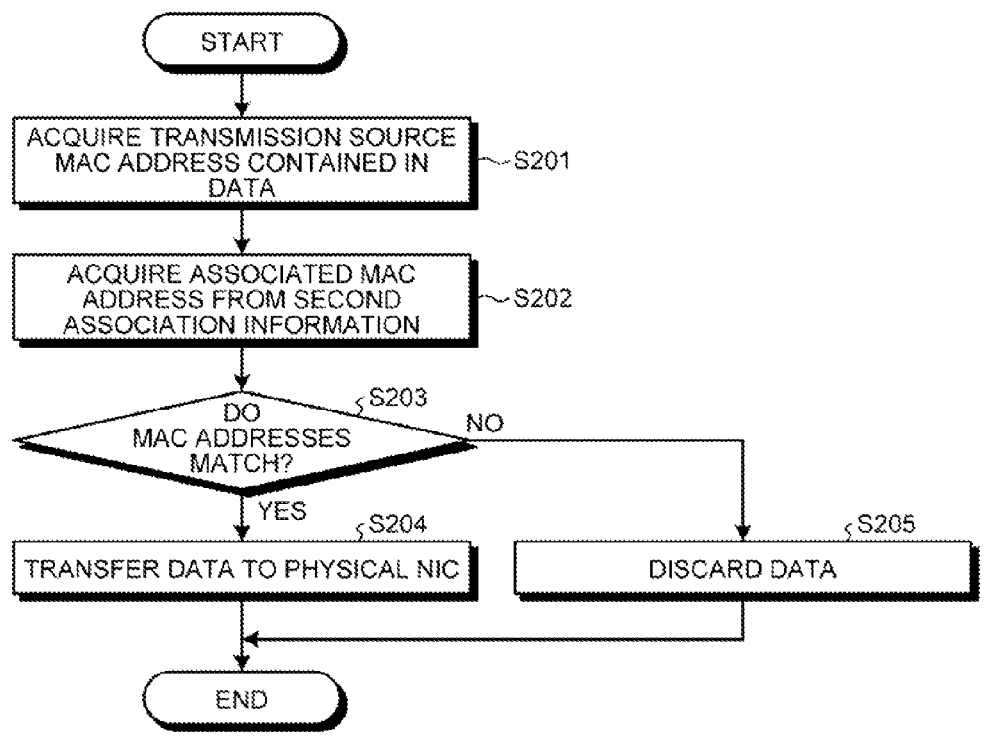
FIG. 10 is a flowchart illustrating the flow of a fraudulent detection process according to the second embodiment.

In the following, the flow of a process performed by the physical server 10 according to the second embodiment will be described. FIG. 10 is a flowchart illustrating the flow of a fraudulent detection process according to the second embodiment. This fraudulent detection process is performed when the virtual switch 18 receives data from a VM that is connected to the port of the virtual switch 18.

As illustrated in FIG. 10, the transferring unit 31 acquires the MAC address of the transmission source VM contained in the data that is transmitted from the VM (Step S201). Then, by using the port name of the port connected to the VM that transmits the data as a key, the transferring unit 31 acquires, from the association relationship between the ports and the MAC addresses indicated by the second association information, the MAC address of the VM connected to the port (Step S202).

Subsequently, the transferring unit 31 determines whether the MAC address of the transmission source VM contained in the data transmitted from the VM matches the MAC address acquired from the association relationship indicated by the second association information (Step S203). If the MAC address of the transmission source VM contained in the data transmitted from the VM matches the MAC address acquired from the association relationship indicated by the second association information (Yes at Step S203), the transferring unit 31 transfers the data to the physical NIC 13 (Step S204) and ends the process. In contrast, if the MAC address of the transmission source VM contained in the data transmitted from the VM does not match the MAC address acquired from the association relationship indicated by the second association information (No at Step S203), the transferring unit 31 discards the data, prohibits the transmission of the data (Step S205), and ends the process.

Figure 11:
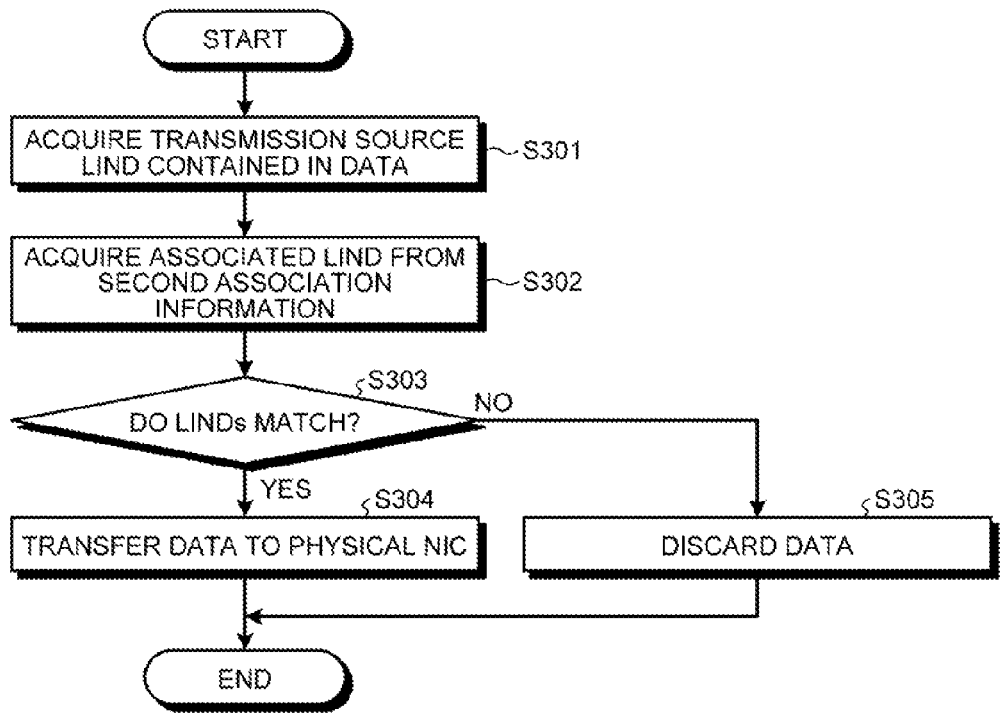
FIG. 11 is a flowchart illustrating the flow of another fraudulent detection process according to the second embodiment.

FIG. 11 is a flowchart illustrating the flow of another fraudulent detection process according to the second embodiment. This fraudulent detection process is performed when the virtual switch 18 receives data from the VM that is connected to the port of the virtual switch 18.

As illustrated in FIG. 11, the transferring unit 31 performs the following process. Namely, by using the MAC address of the transmission source VM contained in the data that is transmitted from the VM as a key, the transferring unit 31 acquires, from the association relationship between the MAC addresses and the LNIDs indicated by the first association information, the LNID associated with the MAC address of the VM (Step S301). Furthermore, by using the port connected to the VM that transmits the data as a key, the transferring unit 31 acquires, from the association relationship between the ports and the LNIDs indicated by the second association information, the LNID of the logical network to which the VM connected to the port belongs (Step S302).

Subsequently, the transferring unit 31 determines whether the LNID acquired from the association relationship indicated by the first association information matches the LNID acquired from the second association information (Step S303). If the LNID acquired from the association relationship indicated by the first association information matches the LNID acquired from the association relationship indicated by the second association information (Yes at Step S303), the transferring unit 31 transfers the data to the physical NIC 13 (Step S304) and ends the process. In contrast, if the LNID acquired from the association relationship indicated by the first association information does not match the LNID acquired from the association relationship indicated by the second association information (No at Step S303), the transferring unit 31 discards the data, prohibits the transmission of the data (Step S305), and ends the process.

Advantage of the Second Embodiment

As described above, if the virtual switch 18 according to the second embodiment receives data containing the MAC address information on the transmission source VM, the virtual switch 18 determines whether the MAC address information on the transmission source VM matches the MAC address information indicated by the first association information. If the MAC address information on the transmission source VM matches the MAC address information indicated by the first association information, the virtual switch 18 according to the second embodiment specifies the logical network that is indicated by the first association information and that is associated with the matched address information. Then, the virtual switch 18 according to the second embodiment determines whether the specified logical network matches the logical network that is indicated by the second association information. If the specified logical network matches the logical network that is indicated by the second association information, the virtual switch 18 according to the second embodiment specifies the port that is indicated by the second association information and is associated with the matched logical network. Accordingly, even if the destination address contained in the data is a broadcast address, the virtual switch 18 according to the second embodiment can broadcast only to the logical network to which the transmission source VM belongs, which makes it possible to more adequately separate the logical network.

Furthermore, the virtual switch 18 according to the second embodiment compares the logical network of the transmission source contained in the data with the logical network associated with the port. Then, if the logical networks do match or if the LNID of either of the logical networks is the "global LNID", the virtual switch 18 according to the second embodiment transfers the received data to a newly acquired port. Specifically, the virtual switch 18 according to the second embodiment does not compare the logical network, to which the transmission source VM that is contained in the data belongs, with the logical network, to which the destination VM contained in the data belongs. The virtual switch 18 according to the second embodiment controls the data transfer by using, for the comparison, the logical network associated with the port without using, for the comparison, the logical network to which the destination VM contained in the data belongs. Accordingly, with the virtual switch 18 according to the second embodiment, it is possible to prevent the occurrence of a case in which the data transfer is not controlled.

Furthermore, the virtual switch 18 according to the second embodiment specifies the logical network associated with the port from the second association information in which the information indicating the port is associated with, one to one, the information indicating the logical network to which the VM connected to the port belongs. Accordingly, when compared with a case of searching for the information indicating the logical network, the virtual switch 18 can easily specify the logical network by searching, using the address information on the transmission source VM as a key, the table that stores therein, in an associated manner, the address information and the information indicating the logical network.

Furthermore, the virtual switch 18 according to the second embodiment can separate the network by adequately transferring the network data that does not contain the identifier for identifying the logical network. Specifically, when compared with a case in which the data contains the identifier for identifying the logical network, the virtual switch 18 according to the second embodiment can separate the network in accordance with the data whose size and load is small on the network. Accordingly, when separating the network, the virtual switch 18 according to the second embodiment can reduce the load on the network.

Furthermore, the virtual switch 18 according to the second embodiment separates the network in accordance with the network data that does not contain the identifier for identifying the logical network. Specifically, because the number of the logical networks to be handled depends on the capacity of the storing unit 15, it is possible to increase the number of logical networks to be handled when compared with a case in which the network data contains the identifier.

Furthermore, if the system 1 according to the second embodiment receives an instruction to allocate a new logical network to the VM that is operated in the physical server 10, the system 1 performs the following process. Namely, the system 1 according to the second embodiment associates the LNID that indicates the logical network, which is to be newly allocated and is indicated by the received instruction, with the MAC address of the VM and then registers them in the LNID table 11*b*. In addition to this, the system 1 according to the second embodiment transmits, to each physical server 10, an instruction to store, in an associated manner, the MAC address of the VM and the LNID indicating the logical network to which the VM belongs. At this time, the system 1 according to the second embodiment transmits, to each physical server 10, an instruction to store only the information in which each of the LNIDs of all of the logical networks to which the VMs operated in the physical server 10 belong is associated with each of the MAC addresses of all of the VMs belonging to the logical networks. Accordingly, only the information, in which each of the LNIDs of all of the logical networks to which the VMs operated in each physical server 10 belong is associated with each of the MAC addresses of all of the VMs belonging to the logical networks, is registered in the first association information stored in each physical server 10. Accordingly, for all of the logical networks and the VMs, when compared with a case of storing the first association information in which the LNIDs are associated with the MAC addresses of the VMs, each storing unit 15 can store a small amount of the first association information. Furthermore, because each storing unit 15 stores therein the first association information in which the LNIDs to which the VMs operated in the physical server 10 belong are associated with the MAC addresses of the VMs, the storing unit 15 stores therein the information needed for the transferring unit 21 controlling the data transfer. Specifically, due to the process performed by the system 1 according to the second embodiment, each storing unit 15 can store therein a small amount of information needed for the control of the data transfer.

Furthermore, If a VM transmits data via a port connected to the VM, the virtual switch 18 according to the second embodiment compares the MAC address of the transmission source VM that is contained in the data with the MAC address acquired from the association relationship indicated by the second association information. If the comparison result indicates that the two MAC addresses differ, the virtual switch 18 according to the second embodiment prohibits the transmission of the data. Furthermore, if a VM transmits data via a port connected to the VM, another virtual switch 18 according to the embodiment compares two LNIDs. Of the two LNIDs, one LNID is an LNID indicated by the first association information that indicates the logical network associated with the MAC address of the transmission source VM contained in the data. The other LNID is an LNID indicated by the second association information that indicates the logical network to which the VM connected to the port belongs. If the comparison result indicates that the two LNIDs differ, the virtual switch 18 according to the second embodiment prohibits the transmission of the data. Accordingly, the virtual switch 18 according to the second embodiment can check whether there is any fraudulent information contained in the data to be transmitted. Furthermore, if the fraudulent information is contained in the data to be transmitted, the virtual switch 18 according to the second embodiment prohibits the transmission of the data, thus preventing the fraudulent data flowing on the network.

In the above explanation, the embodiments of the present invention has been described; however, the present invention can be implemented with various kinds of embodiments other than the embodiments described above. Therefore, in the following, another embodiment included in the present invention will be described below.

For example, in the first and second embodiments, a case has been described in which a virtual switch is connected to a virtual device; however, the present invention is not limited thereto. For example, the present invention may also be used when a physical switch is connected to a physical server, when a virtual switch is connected to a physical server, and when a physical switch is connected to a virtual device.

Furthermore, in accordance with various loads or the operation state, processes performed at each Step described in each embodiment may also arbitrarily be separated or be integrated each other. Furthermore, some Step may also be omitted. For example, processes performed at Steps S105 and S106 illustrated in FIG. 8 may also be integrated.

Furthermore, in accordance with various loads or use conditions, it is also possible to change the order of processes performed at each Step described in each embodiment. For example, before performing the processes at Step S201 illustrated in FIG. 10, the process at Step S202 may also be performed. Furthermore, before performing the processes at Step S301 illustrated in FIG. 11, the process at Step S302 may also be performed.

The components of each device illustrated in the drawings are only for conceptually illustrating the functions thereof and are not always physically configured as illustrated in the drawings. In other words, the specific shape of a separate or integrated device is not limited to the drawings; however, all or part of the device can be configured by functionally or physically separating or integrating any of the units depending on various loads or use conditions. For example, the transferring unit 21 illustrated in FIG. 1 may also be separated into a receiving unit that receives data and a transferring unit that controls the transferring of the received data.

Information Processing Program

Furthermore, the various processes performed by the information processing apparatus described in the above embodiments may also be implemented by a program prepared in advance and executed by a computer system such as a personal computer or a workstation. Accordingly, in the following, a computer that executes an information processing program having the same function as that performed by the information processing apparatus described in the first and second embodiments will be described with reference to FIG. 12.

[c] Third Embodiment

Figure 12:
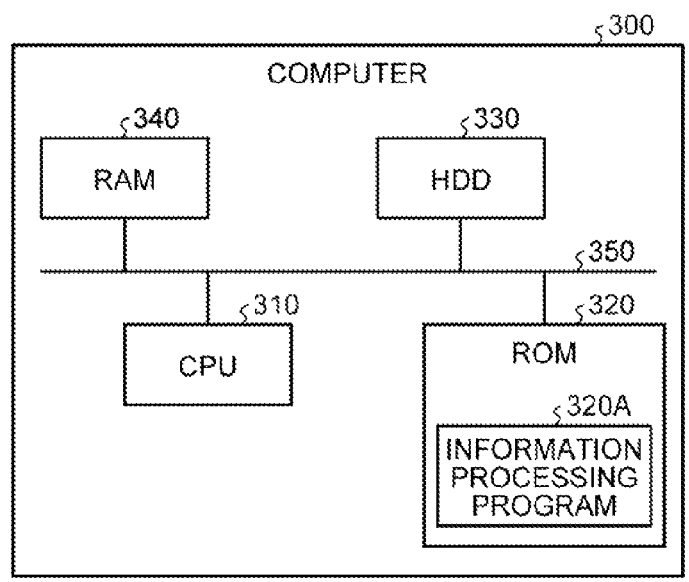
FIG. 12 is a block diagram illustrating a computer that executes an information processing program.

FIG. 12 is a block diagram illustrating a computer that executes an information processing program. As illustrated in FIG. 12, a computer 300 according to a third embodiment includes a central processing unit (CPU) 310, a read only memory (ROM) 320, a hard disk drive (HDD) 330, and a random access memory (RAM) 340, which are connected to via a bus 350.

The ROM 320 stores therein, in advance, an information processing program 320A having the same function as that performed by the transferring unit 21 described in the first embodiment. The information processing program 320A may also appropriately be separated into two programs, for example, a program, which has the same function as that performed by the receiving unit that receives the data, and a program, which has the same function as that performed by the transferring unit that controls the transferring the received data.

Then, the CPU 310 reads the information processing program 320A from the ROM 320 and executes it.

The HDD 330 stores therein first association information and second association information. The first association information and the second association information correspond to the first association information and the second association information, respectively, illustrated in FIG. 1.

Then, the CPU 310 reads the first association information and the second association information and stores them in the RAM 340. Furthermore, by using data on the first association information and the second association information stored in the RAM 340, the CPU 310 executes the information processing program. For the data stored in the RAM 340, not all of the data is needed to be stored in the RAM 340 as long as only the data needed to be processed is stored in the RAM 340.

The information processing program described above does not need to be stored in the ROMs 320 from the beginning.

For example, the program is stored in a "portable physical medium", such as a flexible disk (FD), a CD-ROM, a DVD disk, a magneto-optic disk, an IC CARD, or the like that can be inserted in to a computer 300. Then, the computer 300 may read and execute the program from the flexible disk or the like described above.

Alternatively, the program may also be stored in "another computer (or a server)" connected to the computer 300 via a public circuit, the Internet, a LAN, a WAN, or the like. Then the computer 300 may read and execute the program.

According to an aspect of the information processing apparatus, the system, and the information processing program, a network can be more adequately separated.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A system comprising:
a management server; and
a plurality of information processing apparatuses, wherein
the management server includes a storage control unit that transmits, to the information processing apparatuses, information indicating a logical network, to which a device capable of communicating with each of the information processing apparatuses belongs, and address information on the device belonging to the logical network, and
each of the information processing apparatuses includes:
a storing unit that stores therein first association information, in which address information on a device connected to a port is associated with information indicating the logical network to which the device belongs, and second association information, in which information indicating the port is associated with the information indicating the logical network to which the device connected to the port belongs;
a control unit that allows the storing unit to store the first association information in which information indicating the logical network, which is transmitted from the storage control unit and to which the device capable of communicating with the information processing apparatus belongs, is associated with the address information on the device belonging to the logical network; and
a transferring unit that receives data containing address information on a transmission source device, that specifies, when the address information on the transmission source device matches the address information indicated by the first association information, the logical network that is indicated by the first association information and is associated with the matched address information, that specifies, when the specified logical network matches the logical network indicated by the second association information, the port that is indicated by the second association information and is associated with the matched logical network, and that transfers the data to the specified port.

2. A system comprising:
a management server; and
a plurality of information processing apparatuses, wherein
the management server includes a storage control unit that transmits, to the information processing apparatuses, information indicating a logical network, to which a device capable of communicating with each of the information processing apparatuses belongs, and address information on the device belonging to the logical network, and
each of the information processing apparatuses includes:
a storing unit that stores therein first association information, in which address information on a device connected to a port is associated with information indicating the logical network to which the device belongs, and second association information, in which information indicating the port is associated with the information indicating the logical network to which the device connected to the port belongs;
a control unit that allows the storing unit to store the first association information in which information indicating the logical network, which is transmitted from the storage control unit and to which the device capable of communicating with the information processing apparatus belongs, is associated with the address information on the device belonging to the logical network; and
a transferring unit that receives data containing address information on a transmission source device, that specifies, when the address information on the transmission source device matches the address information indicated by the first association information, the logical network that is indicated by the first association information and is associated with the matched address information, that specifies, when the specified logical network matches the logical network indicated by the second association information, the port that is indicated by the second association information and is associated with the matched logical network, and that transfers the data to the specified port, wherein
the storing unit stores therein the second association information further containing, in an associated manner, the address information on the device connected to the port, and
when the device transmits the data via the port connected to the device, the transferring unit prohibits transmission of the data when the address information on the transmission source device contained in the data is different from the address information, which is indicated by the second association information and is related to the device connected to the port, or when the information indicating the logical network, which is indicated by the first association information and is associated with the address information on the transmission source device contained in the data, is different from the information indicating the logical network, which is indicated by the second association information and to which the device connected to the port belongs.

3. An information processing apparatus comprising:

a memory that stores therein first association information, in which address information on a device connected to a port is associated with information indicating a logical network to which the device belongs, and second association information, in which information indicating the port is associated with the information indicating the logical network to which the device connected to the port belongs; and a processor coupled to the memory, wherein the processor executes a process comprising:

receiving data containing address information on a transmission source device;

specifying, when the address information on the transmission source device matches address information indicated by first association information stored in the memory, the logical network that is indicated by the first association information and is associated with the matched address information;

specifying, when the matched logical network matches the logical network indicated by the second association information, the port that is indicated by the second association information and is associated with the matched logical network; and transferring the data to the specified port.

4. The information processing apparatus according to claim 3, wherein the memory stores therein the second association information further containing, in an associated manner, the address information on the device connected to the port, and the process further includes, when the device transmits the data via the port connected to the device, prohibiting transmission of the data when the address information on the transmission source device contained in the data is different from the address information, which is indicated by the second association information and is related to the device connected to the port, or when the information indicating the logical network, which is indicated by the first association information and is associated with the address information on the transmission source device contained in the data, is different from the information indicating the logical network, which is indicated by the second association information and to which the device connected to the port belongs.

5. A non-transitory computer readable storage medium having stored therein a information processing program causing a computer to execute a process comprising:

receiving data containing address information on a transmission source device;

specifying, when the address information on the transmission source device matches address information indicated by first association information stored in a storing unit that stores therein the first association information, in which address information on a device connected to a port is associated with information indicating a logical network to which the device belongs, and second association information, in which the information indicating the port is associated with the information indicating the logical network to which the device connected to the port belongs, the logical network that is indicated by the first association information and is associated with the matched address information;

specifying, when the matched logical network matches the logical network indicated by the second association information, the port that is indicated by the second association information and is associated with the matched logical network; and transferring the data to the specified port.

6. The storage medium having stored therein the information processing program according to claim 5, further causing a computer to execute a process comprising:

storing, by the storing unit, the second association information further containing, in an associated manner, the address information on the device connected to the port;

prohibiting, at the transferring when the device transmits the data via the port connected to the device, transmission of the data when the address information on the transmission source device contained in the data is different from the address information, which is indicated by the second association information and is related to the device connected to the port, or when the information indicating the logical network, which is indicated by the first association information and is associated with the address information on the transmission source device contained in the data, is different from the information indicating the logical network, which is indicated by the second association information and to which the device connected to the port belongs.

* * * * *